United States Patent [19]

Stoll

[11] 4,389,962
[45] Jun. 28, 1983

[54] OPTICAL DISPLAY UNIT FOR PNEUMATIC SYSTEMS

[76] Inventor: Kurt Stoll, Lenzhalde 72, 73 Esslingen/N., Fed. Rep. of Germany

[21] Appl. No.: 246,964

[22] Filed: Mar. 24, 1981

[30] Foreign Application Priority Data

Mar. 29, 1980 [DE] Fed. Rep. of Germany ....... 3012265

[51] Int. Cl.³ .................. G01D 5/28; G01L 19/12; G08B 5/18
[52] U.S. Cl. .......................... 116/272; 250/231 P; 350/97; 356/373
[58] Field of Search ....... 116/266, 268, 272, DIG. 25; 350/97; 356/373; 250/231 P

[56] References Cited

U.S. PATENT DOCUMENTS

| | | | |
|---|---|---|---|
| 2,676,515 | 4/1954 | Diehl | 116/272 X |
| 3,181,496 | 5/1965 | Bilbrey | 116/70 |
| 3,249,760 | 5/1966 | Miller | 73/705 X |
| 3,639,998 | 2/1972 | Mason | 116/268 |
| 4,072,126 | 2/1978 | Kemp | 116/268 X |

Primary Examiner—Daniel M. Yasich
Attorney, Agent, or Firm—Flynn, Thiel, Boutell & Tanis

[57] ABSTRACT

An optical display unit for pneumatic systems, having a housing with a transparent cover at one end. A mirror part is provided from which light may be shut off by a moving shutter acted upon by a change in pressure, for example an increase in pressure, in a space to be monitored. The body of the display unit takes the form of a hollow guide stem, whose one end has the transparent cover thereon and which has within it a nonmovable inner part with the mirror part as its one end. At the other end of the guide stem there is provided a piston which is able to be moved backwards and forwards and which is loosely joined with a sleeve for moving same. The front end of the sleeve has the shutter thereon for covering up the mirror part. The sleeve is adapted to encircle the nonmovable inner part and is guided in the guide stem.

13 Claims, 2 Drawing Figures

OPTICAL DISPLAY UNIT FOR PNEUMATIC SYSTEMS

BACKGROUND OF THE INVENTION

The present invention relates to a display unit or optical indicator and, more specifically, to a pneumatic display unit having a mirror-coated part placed within, and which may be seen through, a transparent housing. A shutter part is provided for making a change in the light acting on the mirror part when the display unit is acted upon by a change in the pressure of a space in which pressure is to be monitored, for example, with respect to an increase in pressure. Such display units or indicators are used, for example, in control systems for displaying signals, such as control signals or feedback signals.

One purpose of the present invention is that of overcoming the shortcomings of known display units of this sort and of designing a display unit which may be cheaply produced, has a small overall size and may be used for very wide pressure ranges.

For effecting this purpose and other purposes, in the present invention, the display unit is so designed that, on the one hand, it has a hollow guide stem, whose front end to be seen is in the form of a cover made of transparent material, the hollow guide stem having within it a fixed-position or nonmovable inner part whose end nearest the cover is mirror-coated, while on the other hand there is a piston, able to be moved backwards and forwards axially within the hollow guide stem, the piston being loosely but drivingly joined up with a shutter part of a sleeve. The sleeve is placed round the fixed-position or nonmovable inner part and is guided within the guide stem. In this respect, the design may be such that the body of the nonmovable inner part takes the form of a tube having a return spring within it, one end of which rests on a joint between the tube and an end of the fixed inner part and the other end of which rests against an end wall of the sleeve nearest the piston. Furthermore, the end of the fixed inner part may take the form of a generally cylindrical base and a body of revolution becoming narrower in a direction away from the base towards a point, the body of revolution being mirror-coated and having a generatrix in the form of a concaved curve as for example a hyperbola, a parabola, part of an ellipse or the like.

The new display unit or indicator of the invention is marked by a small overall size and it may be used over a very wide pressure range. Furthermore, its moving parts are free-running and the cost of producing it is low because, to a large degree, the inner parts may be injection-molded. Furthermore, the parts may readily be put together and assembly undertaken by untrained workers, since it is hardly possible for there to be any loss of parts on putting the display unit together. Generally speaking, the display unit may be used for large control systems for which feedback signals and command signals have to be displayed all the time. Thus, an important useful effect of the invention in this respect is that the display unit takes up little space and a great number of them may be positioned on a relatively small support plate.

For reasons of production and assembly of the display units, a particularly useful effect is produced if the hollow guide stem is made up of two halves which are joined together, for example by a threaded connection one half terminating in a cover made of transparent material and the other half terminating in a cross-wall having a pipe connection thereon for facilitating a joining up with the space in which the pressure is to be monitored, such space then being joined up with the space within the hollow stem so that the command or feedback pressure signals may take effect within the hollow stem or cylinder through a pipe connection and may be displayed. For the purpose of making the design and assembly of the indicator simpler, it is possible, as a further development of the teaching of the invention, for the sleeve to be made up of two sleeve halves joined together end-to-end and having a different diameter. The sleeve halves are then joined together at a shoulder, the sleeve half with the larger diameter being nearer the mirror part on the tubular fixed inner part, while the other sleeve half is only a little greater in diameter than the tube. The sleeve half with the larger diameter has an inner diameter which is somewhat greater than the outer diameter of the tube of the fixed inner part, whose end, that is to say the mirror part, is best made somewhat greater in diameter (than the tube). In this respect, the design may be such that the hollow stem half with the cover made of transparent material has, towards the middle thereof, an inwardly extending shoulder, against which the shoulder between the two halves of the sleeve comes to rest in the ready-for-use condition of the sleeve. It is best for the stem half with the cover made of transparent material to have an air outlet opening in its middle part, generally at the same level as its shoulder. This air outlet opening is used for bleeding air from inside the guide stem.

A particularly simple operation is made possible if, for example, the fixed inner part and the sleeve are so placed in relation to each other that the sleeve in the starting position thereof is under the effect of a return spring to hold the sleeve away from the mirror part or end of the fixed inner part and when the display or indicator is acted upon by the pressure, answering for example to an increase in pressure, the sleeve will be placed so as to have covered or nearly completely covered the mirror part. For making assembly simpler, it is best for the stem half having the cover thereon to have at its front end, and more particularly at the point at which it is joined with the cover, a radially outwardly extending lip or shoulder. It is preferable for the stem half with the cover thereon to have a coil or other type compression spring encircling same and resting at one end against the free end face of the threadedly connected stem half. The lip-like broader part or shoulder on the end of the stem half with the cover is slipped through a hole in the wall in an outward direction, the lip-like wider part or flange on the stem half coming to rest against the outer face of the support wall. The compression spring takes effect on the other side of the support wall by reason of its other end resting against the end face of the other stem half. On fixing the unit to a support wall, the first step to be taken is for the one stem half to be slipped through the opening in the support wall until its lip comes to rest against the outer face of the support wall and then the sleeve and the fixed inner part within it together with its return spring are put into position from the outer end of the stem. Thereafter the transparent cover is put in position and then from the inner end the second stem half with the piston and the other inner parts is put in position. It will be seen from this that assembly has been made simpler and may readily be undertaken by untrained workers; furthermore loss of any of the parts of the unit on assembly would hardly be possible. It will at once be seen that assembly is responsible for a saving in time.

DETAILED DESCRIPTION

Figure 1:
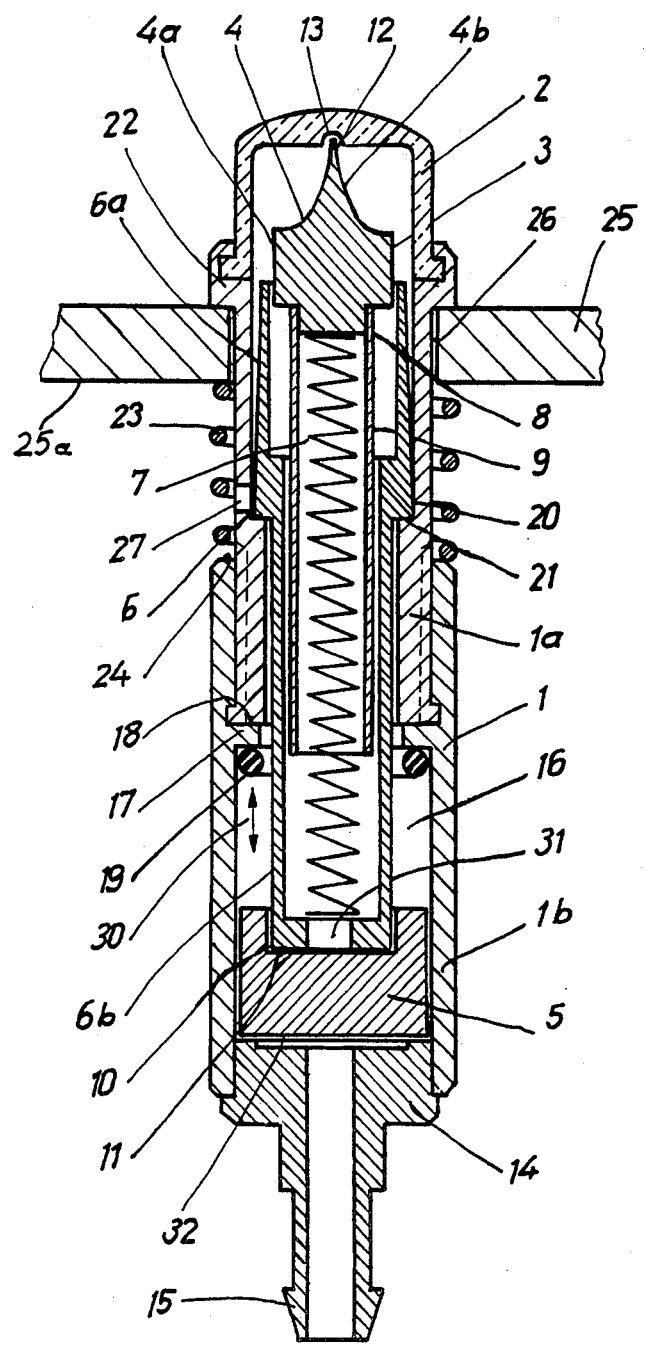
FIG. 1 is a central longitudinal sectional view of a first embodiment of the invention.
Figure 2:
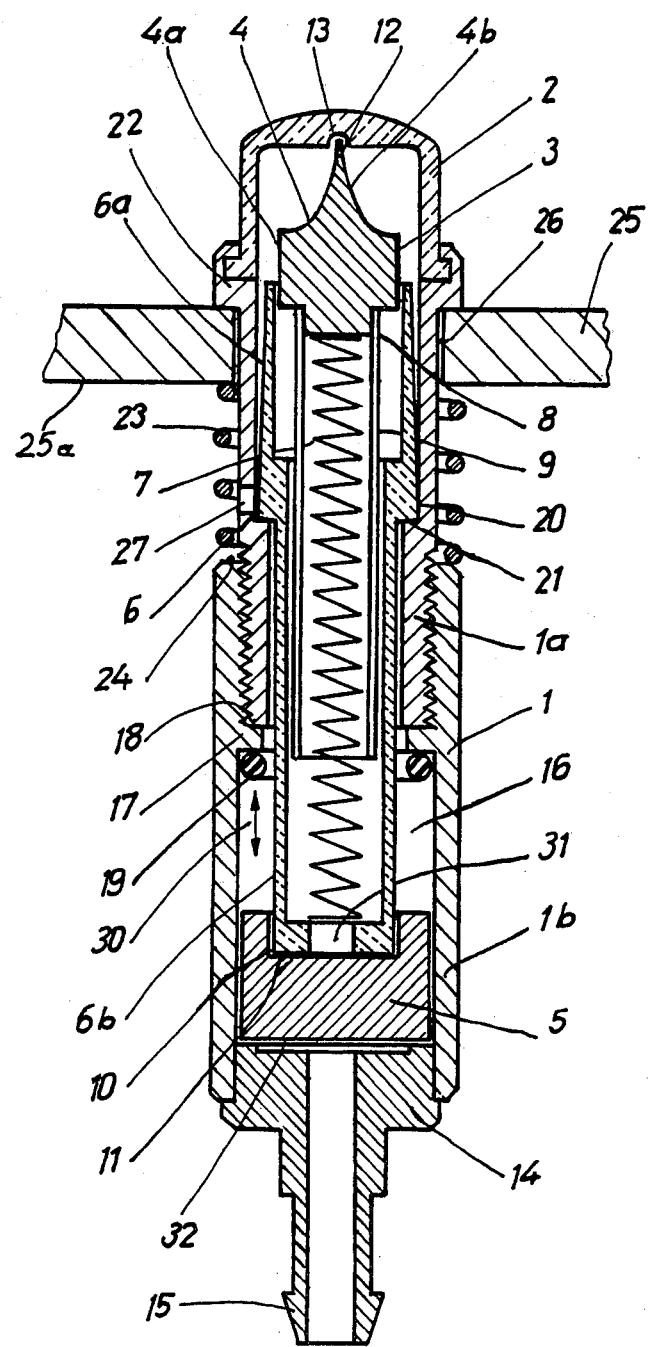
FIG. 2 is a central longitudinal sectional view of a second embodiment of the invention.

The optical display unit or indicator designed, more specially, for pneumatic operation is of the sort having within its housing a mirror-coated part which may be seen through a transparent cover. This mirror part is used with a moving shutter part for cutting off more or less of the light falling on the mirror part, that is to say changing the quality of the light when the shutter part is moved under the effect of a change in a condition, as for example an increase in pressure, in a space to be monitored. Such changes in condition may be transmitted in the form of feedback signals, or it may be a question of displaying control signals.

The unit has a hollow guide stem 1, which is one of the fixed parts of the unit and which has within it a fixed-position or nonmovable inner part 3 and a moving piston 5 which may be moved backwards and forwards in an axial direction (see arrow 30) within the guide stem, piston 5 being loosely but drivingly joined up with a sleeve 6, which encircles the fixed inner part and forms said shutter at one end thereof.

The hollow guide stem 1, whose outwardly extending part has the form of a cover 2 of transparent material, has, as will be made clear later in more detail, two halves 1a and 1b which are threadedly secured together in the present working example and of which the one half has at its free end the transparent cover 2, while the other half has at its free end an end wall 14 with a pipe connection 15 thereon used for connection with the space to be monitored and for the transmission of command or feedback signals to the inner space 16 of the stem. In this respect, the transparent cover 2 and the end wall 14 are joined by their stem halves 1a and 1b being connected force-fit or elastic locking effect or a threaded connection as in a detent. The body of the nonmovable part 3 takes the form of a pipe 9, in which a coil return spring 7, acting in an axial direction, is guided, one end of the spring 7 resting at 8 against the joint between the pipe 9 and the end 4 of the nonmovable inner part 3, the other end of the spring resting against an end wall 10 of the sleeve 6 adjacent the piston 5, the wall 10 having a central through-hole 31, whose diameter is smaller than that of the coil spring 7. The hole 31 is present for purposes of making it simpler for the sleeve 6 to be produced, and more specifically having same made of synthetic resin and enabling same to be removed from a mold. The inner nonmovable part 3 has an end 4 adjacent the cover 2. The end 4 is mirror-coated and is broader or larger in diameter than the pipe 9, as will readily be seen from the drawing. The end 4 is made up of a generally cylindrical base 4a and an end portion 4b which itself is in the form of a body of revolution becoming narrower towards the cover, the generatrix of this body being an inwardly curving hyperbola, parabola or the like or a part of an ellipse. The end portion 4b has its free end point 12 being received in a small pocket 13 in the inside surface of the cover 2.

The piston 5 of the moving part of the display unit has the form of a cylinder, whose one end face has a cylindrical pocket 11 loosely receiving the end of the sleeve 6 therein and having a somewhat larger diameter than the sleeve. For the piston there is a gasket ring 19 in the form of an O-ring resting against a radially inwardly extending support lip 17 in the middle part of the stem half 1b. When the piston 5 is moved into its forward position (in the figure the piston is shown to be in its retracted back position whereat it is kept by the spring 7), it will come to rest against the ring. On the opposite side of the support wall 17 rests the inner end 18 of the hollow stem half 1a, which has the cover 2 thereon. The O-gasket ring 19 is used for high-level sealing of the cylinder space 32 to the back of the piston, when the piston, under the effect of compressed air, is in its front or moved-forward position engaging the O-ring 19.

The sleeve 6 is made up of two sleeve halves 6a and 6b joined end-to-end as a single piece and having different diameters. The sleeve half 6a nearest to the end 4 of the nonmoving inner part 3 has a larger diameter than the sleeve half 6b. These two sleeve halves are joined together at a shoulder 20. Further, the sleeve half 6a has an inner diameter so as to have a small space between it and the broader end 4 on pipe 9 and there is a somewhat smaller distance between the pipe 9 and the sleeve half 6a. Sleeve half 6b has an inner diameter which is only a little greater than the diameter of tube 9 and is smaller in diameter than the sleeve half 6a. The shoulder 20 between the two sleeve halves 6a and 6b will be in a position, in the ready-for-use position of sleeve 6, against resting a further radially inwardly extending shoulder 21 generally in the middle part of the stem half 1a. The stem half 1a has in its middle part, generally at the same level as the shoulder 21, a radially opening air outlet hole 27, by way of which air may escape from the cylinder space between the piston and the cover 2.

The nonmoving inner part 3 and the sleeve 6 are generally of the same length and are so placed in relation to each other that the sleeve 6 in its starting position, under the effect of the return spring 7, is kept more or less completely clear of the end 4 of the nonmoving inner part, as will be seen from the drawing and the end or mirror part is completely or nearly completely covered up thereby when the display unit gets a control or feedback signal. Because the mirror part of the nonmoving inner part is covered, the change in condition may readily be seen by the eye to make it clear that control or feedback signals are acting on the display unit or have stopped acting. The effect produced may be made even clearer to the eye if, for example, the front part of the cover is made of a different color.

The stem half 1a with its transparent cover 2 detentably engaged or threadedly engaged to the stem half 1b. The fact and the fact that this hollow stem half 1a has a radially outwardly extending lip 22, more specially at the position at which it is joined with the transparent cover, makes assembly simpler. The lip 22 may, for example, be six-sided. To this end, that is to say making assembly simpler, there is a compression spring 23 in the form of a coil spring acting on the stem half 1a with the cover 2, the spring being placed between the free end face 24 of the screwed-on stem half 1b facing the cover 2, and the lip 22 on the stem half 1a. The design is such that if the unit is to be fixed to a support wall 25, the half 1a with the cover 2 is slipped through a hole 26 in the support wall in an inward direction so that the lip 22 comes to rest against the outer face of the support wall 25, while the compression spring 23 comes to rest against the other side of the support wall 25, that is to say side 25a. The other end of the spring rests against the aforesaid free end face 24 so that, while making certain of simple assembly, the display or indicator unit of the present invention is safely kept in position. Furthermore, the compression spring 23 has a further purpose. It functions as a stop for the stem half 1b when the two stem halves 1a and 1b are screwed together, it stopping any chance of the stem half 1b being urged to a position to shut off the outlet hole 27 when the unit is put together. On fixing the unit to the support wall 25, the first step is that of slipping the male hollow stem half 1a in through hole 26 in the wall till its lip 22 comes to rest against the outer face of the support wall 25, whereupon the sleeve 6 and the nonmoving inner part 3 within it, possibly with the return spring 7, are slipped in from the outer end of the stem half 1a. The shoulder 21 is used to keep the parts in their desired position. Then the cover 2 made of transparent material is slipped into position. A working on the other side of the support wall 25 will enable the second stem half 1b with the piston 5 and the remainder of the inner parts, possibly with the spring 7 if the same has not been put into position from the other end, put in place and screwed onto the stem half 1a. Using this way of assembly, there is, generally speaking, no chance of any loss of the different inner parts and other pieces of the unit.

The guide stem may be made of metal while the inner parts of the unit may be made of synthetic resin so that the price of producing the unit is especially low. It is best for the front part of the moving sleeve to be made of transparent material which may be, for example, specially colored, for example using fluorescent coloring material.

In operation, a pressure appearing in the zone being monitored will cause the piston 5 to move axially toward the gasket ring 19 to urge the sleeve 6 axially therewith. The sleeve part 6a will move to a position encircling the fixed inner part 3 to thereby alter the appearance of the mirror part 4 as seen through the transparent cover 2. A decrease in the monitored pressure will cause the sleeve 6 and piston 5 to be urged back toward the end wall 14 by the return spring 7. Thus, the mirror part 4 will again be entirely visible through the cover 2.

The embodiments of the invention in which an exclusive property or privilege is claimed are defined as follows:

1. In an optical display unit having a fixed mirror part visible to the outside of said unit and a sleeve means movable in relation to said mirror part for altering the appearance of said mirror part by selectively cutting off light therefrom when said unit is acted upon by an input pressure signal, said unit comprising a hollow guide stem having a transparent cover through which said mirror part is made visible to an observer of said display unit, a fixed inner part to which said mirror part is secured, said sleeve means including a sleeve, a piston movably mounted in said hollow guide stem for movement backwards and forwards in said guide stem, the improvement comprising wherein said guide stem is composed of two halves and includes connecting means for facilitating a connection to one another, one half terminating at said transparent cover and the other half terminating at an end wall having a pipe connection thereon for facilitating a connection of the pressure signal to a space whose pressure condition is to be monitored and displayed, whereby said piston is driven upwardly in response to said input pressure signal, and wherein said piston is reciprocally mounted in said other half between said end wall and a stop means intermediate said one half and said end wall, said piston further being free of a fixed connection to said sleeve but drivingly joined to said sleeve to facilitate assembly.

2. An optical display unit as claimed in claim 1, wherein said mirror part is a body of revolution becoming narrower in a direction away from a generally cylindrical base part of said body of revolution joined to said tube, said narrowing part being mirror-coated and having a point which is received in a blind hole in said transparent cover.

3. An optical display unit as claimed in claim 1, wherein said end wall is in the form of a stopper forced fit into and elastically locked within said guide stem.

4. An optical display unit as claimed in claim 1, wherein said fixed inner part is in the form of a tube having within it a return spring with one end resting against a joint between said mirror part and said tube and with the other end thereof resting against a narrow wall part at the other end of said sleeve means adjacent said piston, said mirror part being larger in diameter than said tube.

5. An optical display unit as claimed in claim 4, wherein said narrow wall part adjacent said piston has a central through-hole smaller in diameter than the diameter of said spring, said narrow wall part of said sleeve means being loosely received in a pocket in said piston.

6. An optical display unit as claimed in claim 4, wherein said other stem half having said end wall thereon has at the end thereof remote from said end wall an inwardly extending lip, wherein said one stem half, which has the transparent cover thereon, rests against one side of said lip, and a gasket ring which rests against the other side of said lip, said piston engaging said gasket ring when moved towards said cover.

7. An optical display unit as claimed in claim 6, wherein said sleeve means is made up of two sleeve halves of different diameters placed end-to-end and forming a shoulder whereat they are joined together, that sleeve half which is nearer to said cover and forming said sleeve being larger in diameter than said other sleeve half, said sleeve having an inner diameter which is greater than the diameter of said mirror part while the other half of said sleeve has an inner diameter which is only a little larger than the outer diameter of said sleeve means, said one stem half with said cover having a radial air outlet opening, generally at the same level as said shoulder therein, said shoulder between said two sleeve halves resting against a further shoulder in said guide stem in the ready-for-use condition of said sleeve means.

8. An optical display unit as claimed in claim 7, wherein said fixed inner part and said sleeve means are generally of the same length and are so placed in relation to each other that said sleeve means in the starting position under the effect of said return spring, is moved generally completely clear of said mirror part on said inner part while when the unit is acted upon by pressure, said mirror part is covered by said sleeve.

9. An optical display unit as claimed in claim 8, wherein said one stem half with said transparent cover is received within one end of said other stem half and the point at which it is joined to said cover has a radially outwardly extending lip.

10. An optical display unit as claimed in claim 9, wherein a coil compression spring encircles said one stem half with said transparent cover, said spring being located between a free axially facing surface on the end of said other stem half and a first surface on a support wall, wherein said one stem half has a lip thereon for facilitating engagement with an oppositely facing second surface on said support wall, the end of the unit with the cover being slipped through a hole in the support wall from the outside until said lip comes to rest against said second surface, whereas the compression spring is placed with one end resting against said first surface of said support wall and with the other end resting against the axially facing surface on said other stem half.

11. An optical display unit as claimed in claim 10, wherein said connecting means includes a threaded connection and wherein said compression spring is used as a stop on screwing together the said two stem halves so that said radial air outlet opening is kept uncovered.

12. An optical display unit as claimed in claim 11, wherein on assembly of the unit on the support wall firstly said one stem half is slipped into said hole in the support wall until said lip comes to rest against said second surface and then said sleeve means and said fixed inner part within it together with the return spring are placed from the outside in the said one stem half and then said cover of transparent material is put in position and then, working from the other side of the support wall, said other stem half with the piston and the rest of the inner parts therein are put in position and said other stem half secured to said one stem half.

13. An optical display unit according to claim 1, wherein said sleeve is made of a transparent material.

* * * * *